(No Model.)
N. SCHWAB.
CIGAR CASING.
No. 532,916.  Patented Jan. 22, 1895.
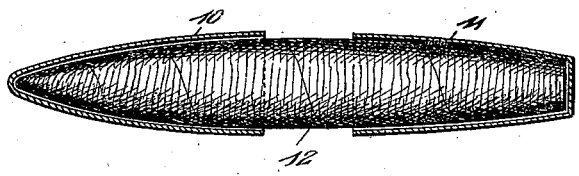
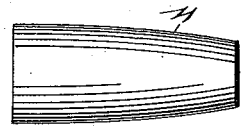
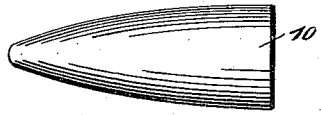
WITNESSES:
INVENTOR
ATTORNEYS.

UNITED STATES PATENT OFFICE.

NATHAN SCHWAB, OF NEW YORK, N. Y.

CIGAR-CASING.

SPECIFICATION forming part of Letters Patent No. 532,916, dated January 22, 1895.

Application filed September 21, 1894. Serial No. 523,738. (No model.)

*To all whom it may concern:*

Be it known that I, NATHAN SCHWAB, of New York city, in the county and State of New York, have invented certain new and useful Improvements in Packing Cigars, of which the following is a full, clear, and exact description.

It is a common practice to carry cigars in the pocket without the protection of a case, as cigar cases are usually bulky, and when cigars are thus carried it frequently happens that they are broken and spoiled.

The object of my invention is to obviate this difficulty and to do it in a way which will not in the least inconvenience a smoker, and to do this I provide cheap protecting casings adapted to envelop the ends of the cigar, these casings being cheap enough to permit them to be applied at normal expense to each individual cigar when the cigars are packed in a box, and when the cigars are consumed the smoker removes and throws away the protecting casings.

In carrying out my invention the casings may be made of glue, gelatine, celluloid, paper or any material possessing sufficient strength and which is sufficiently cheap, the length of the casings depending somewhat on the nature of the cigars to which they are applied, but the casings in each instance are of a combined length less than the extreme length of the cigar, the result being that a portion of the cigar at its middle is exposed sufficient to denote the color and quality of the cigar. This is important as it permits the purchaser or user to select a cigar by its color, quality or for other reasons of preference, and such exposed portion may also serve to be held in one hand while the sections are being removed.

The invention consists in the novel construction, combination and arrangement of parts as will be hereinafter described and pointed out in the claim.

Reference is to be had to the accompanying drawings, forming a part of this specification, in which similar figures of reference indicate corresponding parts in all the views.

Figure 1 shows a cigar with the casings applied, the casings being shown in longitudinal section. Fig. 2 is a side elevation of the casing adapted for application to the butt of the cigar; and Fig. 3 is a side elevation of the casing which is applicable to the point of the cigar.

The casing 10 is shaped to correspond with the point of the cigar 12 and the casing 11 is shaped to fit snugly on the opposite end of the cigar. The casings have each sufficient rigidity to prevent the cigar from being smashed or broken, and as illustrated they leave the middle portion of the cigar exposed when they are applied to the cigar ends, but it will of course be understood that the casings may be made longer or shorter without departing from the principle of the invention.

It will be seen that the casings form a secure protection for the cigar and that they may be instantly removed and thrown away when necessary, so that the smoker is in nowise inconvenienced by their use.

An important (in fact an essential) feature of my invention, and wherein the same distinguishes its novelty, is the fact that my separate protector sections are integral from end to end, conform closely in contour with the butt end and point of the cigar, are closed at their outer ends and hug closely the cigar throughout the lengths of these sections. Now these features are important not only alone but because they combine or coact in producing the protector which has the properties of protection desired, not only against fracture, but also against waste of moisture from the cigar and not only these, but by making the sections to hug the cigar throughout their lengths, I make them self retaining so that when placed on the cigar they will retain their places until intentionally removed.

It should be understood that it is my purpose in practice to make the protecting sections each to fit the shape of the cigar to which it is to be applied, separate shapes and sizes being made to properly protect the different shapes and sizes of cigars.

Having thus described my invention, I claim as new and desire to secure by Letters Patent—

As an improved article of manufacture, a cigar having upon each end separate individual protector sections, each conforming closely to the contour of its respective end of the cigar, said sections being closed at their outer ends, and being made relatively to hug closely the side of the cigar, such sections being of a combined length less than that of the cigar, whereby to expose between them a portion of the cigar to denote its color and quality, all substantially as described, whereby the said sections will protect the cigar against fracture and loss of moisture, and will also be self retaining thereon, substantially as and for the purpose set forth.

NATHAN SCHWAB.

Witnesses:
WARREN B. HUTCHINSON,
WM. P. PATTON.